Patented May 19, 1936

2,041,584

UNITED STATES PATENT OFFICE 2,041,584

PROCESS FOR THE PURIFICATION OF WATER

Martha Adler, Carlsbad, Czechoslovakia

No Drawing. Application August 30, 1934, Serial No. 742,146. In Czechoslovakia October 24, 1933

3 Claims. (Cl. 210—23)

When contained in water in too high a degree, germs, calcium salts, magnesium salts, iron salts and manganese salts, or free acids, such as mineral acids, in particular carbonic acid, are considered as the main injurious contents of water.

In order to remove these injurious constituents, numerous processes have been proposed, but there exists no generally applicable process suitable for removing all of these constituents.

The subject of this invention is a process meeting this requirement. It has been found that water containing some or all of the aforesaid injurious elements may be freed therefrom if it is made to flow, if necessary, after the previous addition of germicidal and oxidizing substances, over water-resistant basic or neutral calcium sulphite in the form of lumps, and any remaining excess of calcium sulphite or calcium hydroxide is precipitated by means of carbonates or phosphates of alkalies.

The calcium sulphite in question must be in lumpy water-resistant form, in order to offer no particular resistance to the water flowing through and in order to preserve this state even after long use without losing any of its solidity or hardness. In order to meet the aforesaid requirements, it must, therefore, according to the purpose of use, contain either merely the component $CaSO_3$ or the two components $CaO$ and $CaSO_3$, that is to say, it must be present in the form of neutral or basic salt, and consequently correspond to the general formula $mCaO.nCaSO_3$.

The process according to the present invention will hereinafter be explained with the aid of a series of working examples, which must be altered according to requirement, without the spirit of the invention being affected thereby.

Example 1.—Removal of the germs

The water to be sterilized is, if necessary, after treatment with clarifying agents such as aluminium or iron sulphate, active carbon and the like, mixed with sufficient quantities of a germicidal substance, such as chlorine, hypochlorite, ozone or hydrogen peroxide, and after a suitable period of action, passed over lumpy, water-resistant, basic or neutral calcium sulphite. The excess of germicidal medium (the action of which is based on the formation of nascent oxygen) still present, is completely removed according to the formula $$CaSO_3 + O = CaSO_4$$

Example 2.—Removal of the iron and manganese

To the water to be purified is added an oxidizing medium, such as chlorine, hypochlorite, ozone or hydrogen peroxide, whereby the iron released as a ferro-compound is converted into ferric hydroxide. In order to separate the latter, the water passes through a sand filter and then a receptacle filled with the previously mentioned lumpy, water-resistant calcium sulphite, the excess of oxidizing medium being completely removed. The manganese is also separated from the water by this treatment.

Example 3.—Removal of the calcium and magnesium

The water to be purified, which contains the bicarbonates or sulphates or chlorides of calcium and magnesium, is passed over the aforesaid basic, lumpy, wate-resistant calcium sulphite with as high as possible a proportion of CaO. According to the formula $$CaO + Ca(HCO_3)_2 = 2CaCO_3 + H_2O$$

the soluble bicarbonates of calcium and magnesium are thereby converted into insoluble carbonates. The excess of dissolved basic calcium sulphite and the calcium and magnesium present in the water as sulphate or chloride is precipitated by alkali carbonate or phosphate. The precipitated salts of the calcium and magnesium are removed by filtration. The water is thereby for the greater part also freed from iron.

Example 4.—Removal of the free acid

The water to be purified is passed through a container filled with the aforesaid calcium sulphite. The speed at which it passes through is so regulated that the dissolved portion of basic calcium sulphite produces an alkalinity of a pH-value of over 7.

The practical forms referred to in the example may also be suitably combined.

What I claim and desire to secure by Letters Patent of the United States:—

1. Process for the purification of water which consists in passing water over lumpy, water-resistant calcium sulphite.

2. Process for the purification of water which consists in passing water in continuous flow over lumpy, water-resistant, basic calcium sulphite which is capable of retaining its distinct lumpy form intact in the presence of the continuous flow of water.

3. Process for the purification of water which consists in passing water in continuous flow over lumpy, water-resistant, neutral calcium sulphite which is capable of retaining its distinct lumpy form intact in the presence of the continuous flow of water.

MARTHA ADLER.